(12) United States Patent
Kim et al.

(10) Patent No.: US 8,605,612 B2
(45) Date of Patent: Dec. 10, 2013

(54) METHOD AND APPARATUS FOR EXTRACTING QOS PARAMETERS IN MOBILE DEVICE

(75) Inventors: Sun-Ju Kim, Suwon-si (KR); Sang-Min Bae, Suwon-si (KR); Hyun-Gu Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 534 days.

(21) Appl. No.: 12/808,981

(22) PCT Filed: Dec. 17, 2008

(86) PCT No.: PCT/KR2008/007467
§ 371 (c)(1),
(2), (4) Date: Jun. 17, 2010

(87) PCT Pub. No.: WO2009/078661
PCT Pub. Date: Jun. 25, 2009

(65) Prior Publication Data
US 2010/0290361 A1    Nov. 18, 2010

(30) Foreign Application Priority Data
Dec. 17, 2007  (KR) .................. 10-2007-0132001

(51) Int. Cl.
*G01R 31/08*        (2006.01)
(52) U.S. Cl.
USPC .......................................................... 370/252
(58) Field of Classification Search
None
See application file for complete search history.

(56) References Cited

U.S. PATENT DOCUMENTS

| | | | |
|---|---|---|---|
| 2005/0238026 A1 | 10/2005 | Wu et al. | |
| 2006/0039293 A1* | 2/2006 | Uthe | 370/252 |
| 2006/0291472 A1* | 12/2006 | Guo et al. | 370/395.5 |
| 2007/0091898 A1 | 4/2007 | Rengaraju et al. | |
| 2008/0137625 A1* | 6/2008 | Hori et al. | 370/338 |
| 2008/0159232 A1* | 7/2008 | Thalanany et al. | 370/332 |
| 2009/0072965 A1* | 3/2009 | Staab | 340/539.11 |

FOREIGN PATENT DOCUMENTS

KR    10-2004-0110032 A    12/2004

OTHER PUBLICATIONS

Written Opinion of the International Search Report Authority dated Mar. 13, 2009 (PCT/ISA/237) (3 pp.).

* cited by examiner

*Primary Examiner* — John Blanton
(74) *Attorney, Agent, or Firm* — The Farrell Law Firm, P.C.

(57) ABSTRACT

Provided are a method and an apparatus for extracting QoS parameters in a mobile device. In the method, all packets received from a terminal device are monitored, and SIP packets are filtered. When a real-time service application is executed on the terminal device, and an SIP request packet or an SIP response packet is filtered and input, QoS parameters are extracted from the SIP request packet or the SIP response packet. The extracted QoS parameters are incorporated into a wireless link data resource request and transmitted to a wireless network device. When a response to the wireless link data resource request is received, an uplink filter value for a new resource is extracted and added to a packet monitoring list.

6 Claims, 5 Drawing Sheets

Fig. 1
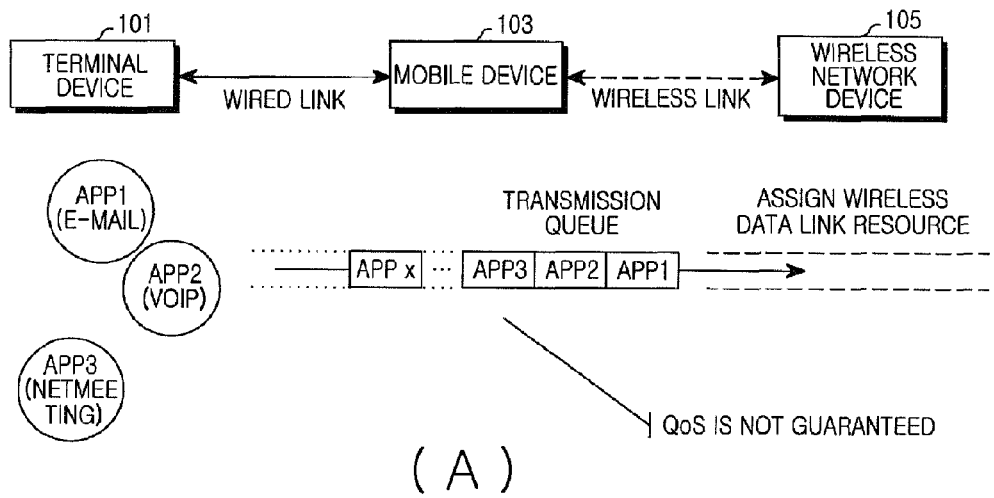
(A)
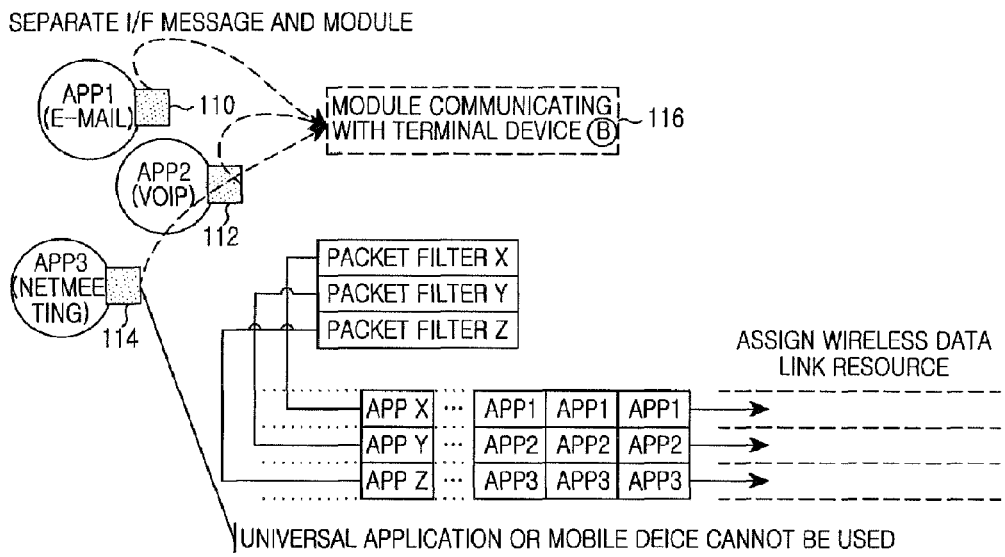
(B)

METHOD AND APPARATUS FOR EXTRACTING QOS PARAMETERS IN MOBILE DEVICE

TECHNICAL FIELD

The present invention relates to a method and an apparatus for extracting Quality of Service (QoS) parameters in a mobile device, and in particular, to a method and an apparatus for guaranteeing QoS of an Internet phone or a video communication application requiring real-time service of a terminal device such as a personal computer (PC) in a high speed wireless data communication system.

BACKGROUND ART

A terminal device such as a PC has conventionally transmitted all traffic data from applications used for the terminal device regardless of applications from which the traffic data comes, to a wireless link via a modem function of a mobile terminal. Therefore, an application such as an Internet phone and video communication that should guarantee end-to-end real-time service transmits and receives session information of the application using Session Initiation Protocol (SIP). Here, in the case where the application is executed on a mobile device, the mobile device can control and monitor creation, modification, and deletion of the session.

However, in the case where the application is executed on a terminal device, and the mobile device serves as only a modem, the mobile device processes data coming from the terminal device and transmits the processed data to a link only. At this point, since the mobile device is not aware of a service being executed on the data, the mobile device realizes a predetermined interface with an application executed on the terminal device, and performs a request for opening a wireless link suitable for real-time service in order to execute the real-time service.

However, the application of the terminal device executed in this method is not universally used but is peculiar to the software of the mobile device. Therefore, since a different application is used depending on a mobile device through which the service is executed, much inconvenience is generated.

FIGS. 1A and B are illustrating a construction of providing data service in real-time through a mobile device in a conventional wireless communication system.

The wireless communication system includes a terminal device 101, a mobile device 103, and a wireless network device 105. Referring to FIG. 1A, the terminal device 101 sequentially transmits all data to the mobile device 103 without discriminating applications. Therefore, the system has a limitation of not guaranteeing the QoS of an application being executed.

To resolve the above limitation, a method illustrated in FIG. 1B has been used. In the method, all traffic data transmitted from the terminal device 101 are discriminated, and when a wireless link status is poor, traffic data of respective applications are discriminated in a transmission queue and packets corresponding to real-time service are transmitted first.

Referring to FIG. 1B, information as to the QoS of service provided by an application executed on the terminal device 101 is transmitted through special control frames 110, 112, and 114.

After that, the mobile device 103 analyzes the special control frames 110, 112, and 114 through a module 116 communicating with the terminal device, requests a wireless link resource suitable for the QoS, receives a new resource suitable for the application, and obtains a packet classifier to be mapped to the resource.

After that, data received from the terminal device are classified by the packet classifier, and transmitted to the new resource, so that the QoS is guaranteed.

However, though the above-described method guarantees the QoS of the application, a method of receiving QoS confirmation from the terminal device 101 involves a special process of having to directly modify the application software, so that the method is not universally used and is limited in its usage.

DISCLOSURE OF INVENTION

Technical Solution

An object of the present invention is to provide a method and an apparatus for extracting QoS parameters in a mobile device.

Another object of the present invention is to provide a method and an apparatus for transferring QoS information of a terminal device to a mobile device.

Still another object of the present invention is to provide a method and an apparatus for transmitting/receiving data to/from a wireless data resource link suitable for QoS of an application being executed.

According to an aspect of the present invention, a method for extracting Quality of Service (QoS) parameters in a mobile device, the method includes: monitoring all packets received from a terminal device to filter Session Initiation Protocol (SIP) packets; when a real-time service application is executed on the terminal device and an SIP request packet or an SIP response packet is filtered and input, extracting QoS parameters from the SIP request packet or the SIP response packet; incorporating the extracted QoS parameters into a wireless link data resource request and transmitting the same to a wireless network device; and when a response to the wireless link data resource request is received, extracting an uplink filter value for a new resource and adding the same to a packet monitoring list.

According to another aspect of the present invention, an apparatus for extracting QoS parameters in a mobile device, the apparatus includes: an SIP packet monitoring module for monitoring all packets received from a terminal device to filter SIP packets and adding an uplink filter value for a new resource input by a session management module to a packet monitoring list; an SIP session handling module for, when a real-time service application is executed on the terminal device, and an SIP request packet or an SIP response packet is filtered and input, extracting QoS parameters from the SIP request packet or the SIP response packet; and a session management module for incorporating the extracted QoS parameters into a wireless link data resource request and transmitting the same to a wireless network device, and when a response to the wireless link data resource request is received, extracting the uplink filter value for the new resource and transferring the same to the SIP packet monitoring module.

BRIEF DESCRIPTION OF THE DRAWINGS

The above and other objects, features and advantages of the present invention will become more apparent from the following detailed description when taken in conjunction with the accompanying drawings in which:

FIGS. 1A and B are view illustrating a construction of providing data service in real-time through a mobile device in a conventional wireless communication system;

BEST MODE FOR CARRYING OUT THE INVENTION

Preferred embodiments of the present invention will be described herein below with reference to the accompanying drawings. In the following description, well-known functions or constructions are not described in detail since they would obscure the invention in unnecessary detail.

Exemplary embodiments of the present invention provide a method and an apparatus for receiving QoS information of a terminal device and setting a wireless data resource link suitable for QoS of an application being executed on a mobile device.

Figure 2:
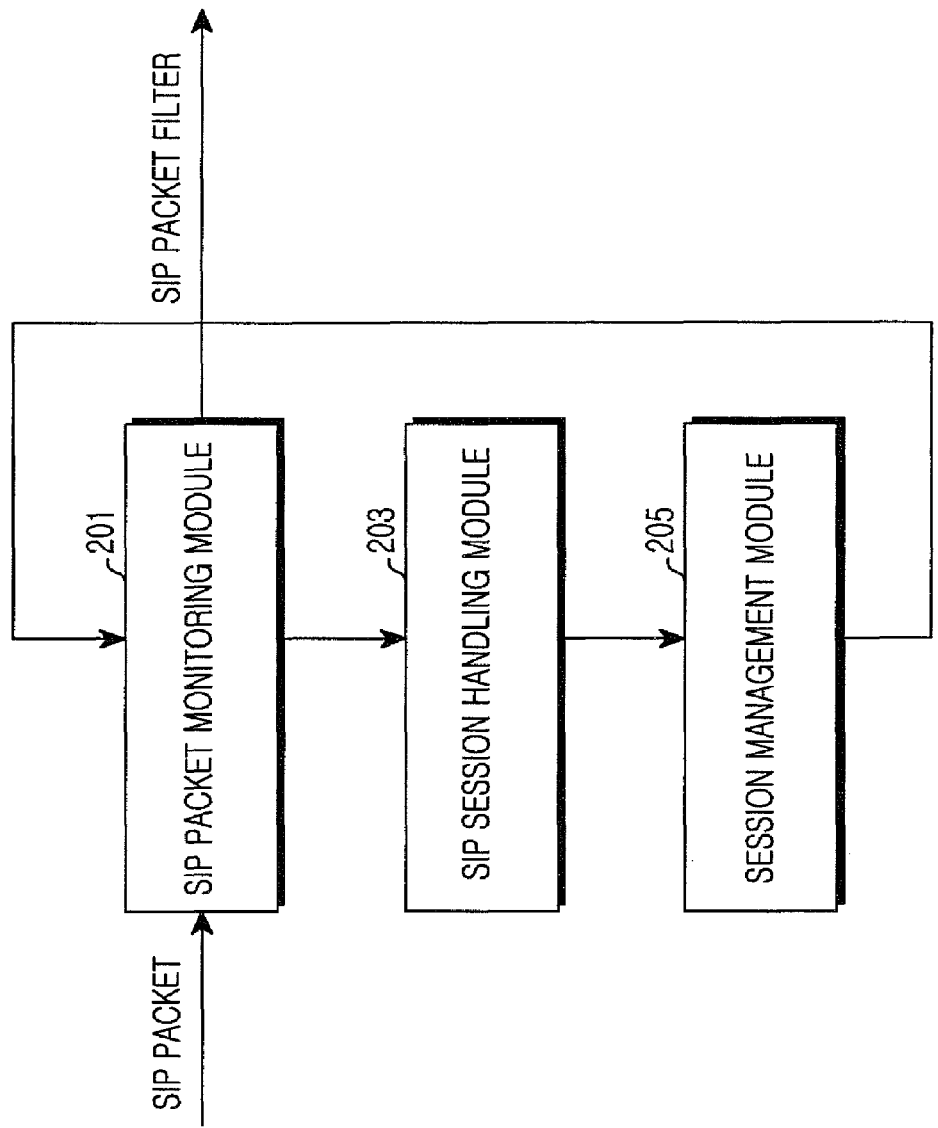
FIG. 2 is a view illustrating a block diagram for extracting QoS parameters in a mobile device according to an exemplary embodiment of the present invention.

FIG. 2 illustrates a block diagram for extracting QoS parameters in a mobile device according to an exemplary embodiment of the present invention. Here, the mobile device includes an Session Initiation Protocol (SIP) packet monitoring module 201, an SIP session handling module 203, and a session management module 205.

The SIP packet monitoring module 201 monitors all packets received from a terminal device (not shown). When the terminal device executes an application requiring a real-time service, the terminal device transmits/receives SIP session information to/from a wireless network device (or host terminal device). At this point, when the terminal device makes an SIP request, the SIP packet monitoring module 201 filters packets according to an SIP packet characteristic, that is, filters packets having an IP header whose protocol field value is 'User Datagram Protocol (UDP)' and having a UDP header whose destination port number is '5060', copies all the filtered packets, and outputs the packets to the SIP session handling module 203.

Also, when an SIP response is received from the wireless network device, the SIP packet monitoring module 201 monitors packets received from the wireless network device, filters packets according to the SIP packet characteristic, copies all the filtered packets, and outputs the packets to the SIP session handling module 203.

Also, when a packet filter value is input from the session management module 205, the SIP packet monitoring module 201 adds the input packet filter value to a packet monitoring list table including an Internet Protocol (IP) address and a port number, and discriminates data of an application being executed from data coming from the terminal device to allow the data of the application to be transmitted/received to/from an assigned wireless data resource link.

The SIP session handing module 203 extracts session description protocol (SDP) data from an input packet, extracts QoS parameters from the extracted SDP data, and outputs the extracted QoS parameters to the session management module 205.

The session management module 205 transmits a wireless data resource request to the wireless network device using the input QoS parameters. Also, when a response message to the wireless data resource request is received, the session management module 205 extracts a filter value for a new resource from the response message, and outputs the extracted filter value to the SIP packet monitoring module 201.

Figure 3:
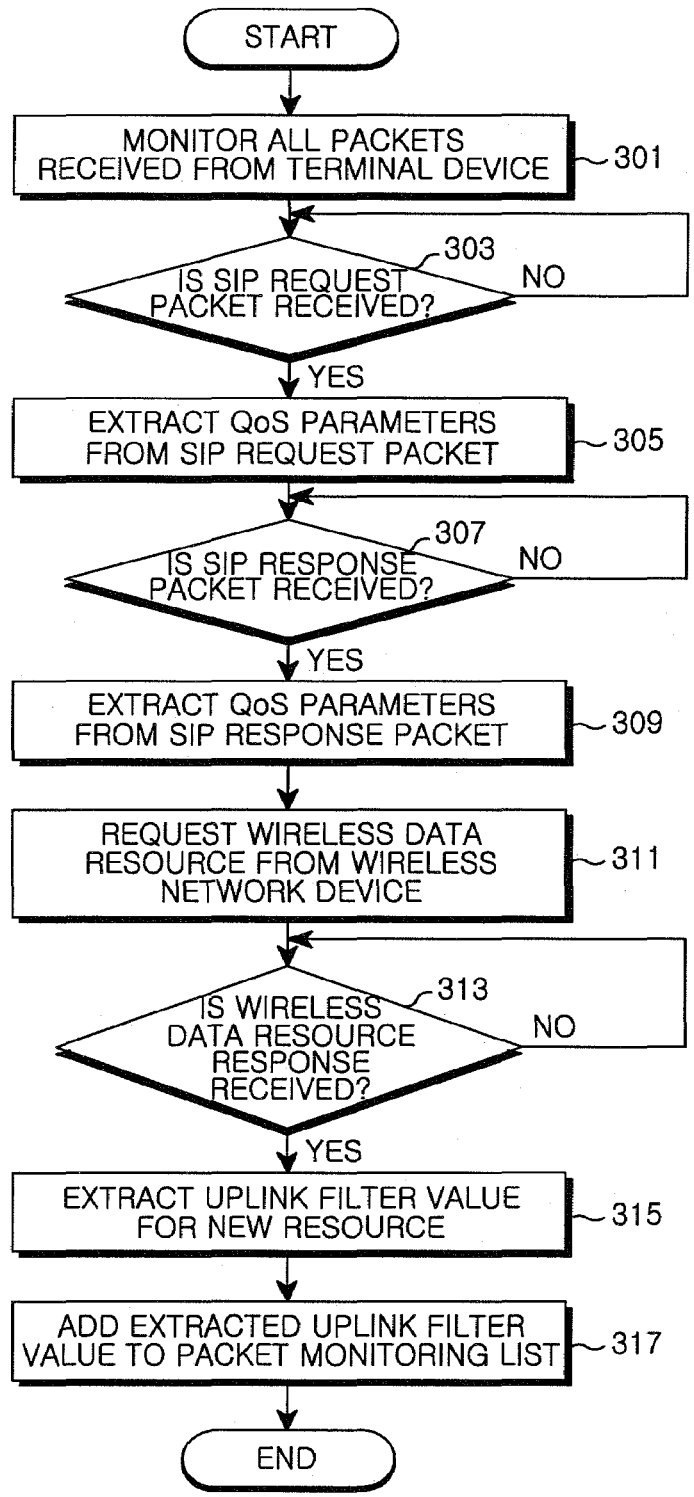
FIG. 3 is a view illustrating a procedure for extracting QoS parameters in a mobile device according to an exemplary embodiment of the present invention.

FIG. 3 illustrates a procedure for extracting QoS parameters in a mobile device according to an exemplary embodiment of the present invention.

Referring to FIG. 3, in step 301, the mobile device monitors all packets received from the terminal device. In step 303, the mobile device examines whether an SIP request packet is received. When the SIP request packet is received, the mobile device extracts SDP data from the SIP request packet and extracts QoS parameters (IP QoS parameters) from the extracted SDP data in step 305.

After that, in step 307, the mobile device examines whether an SIP response packet is received from a wireless network device (or host terminal device). When the SIP response packet is received, the mobile device extracts SDP data from the SIP response packet, and extracts QoS parameters from the extracted SDP data.

After that, in step 311, the mobile device requests a wireless data resource by performing a call setup request requesting the wireless network device to transmit a radio bearer (RB), and in step 313, examines whether a wireless data resource response is received from the wireless network device. When the wireless data resource response is received from the wireless network device, the mobile device extracts an uplink filter value for a new resource in step 315.

After that, in step 317, the mobile device adds the extracted uplink filter value to a packet monitoring table, and discriminates data of an application being executed from data coming from the terminal device to allow the data of the application to be transmitted/received to/from an assigned wireless data resource link.

After that, the mobile device ends an algorithm according to the exemplary embodiment of the present invention.

Figure 4:
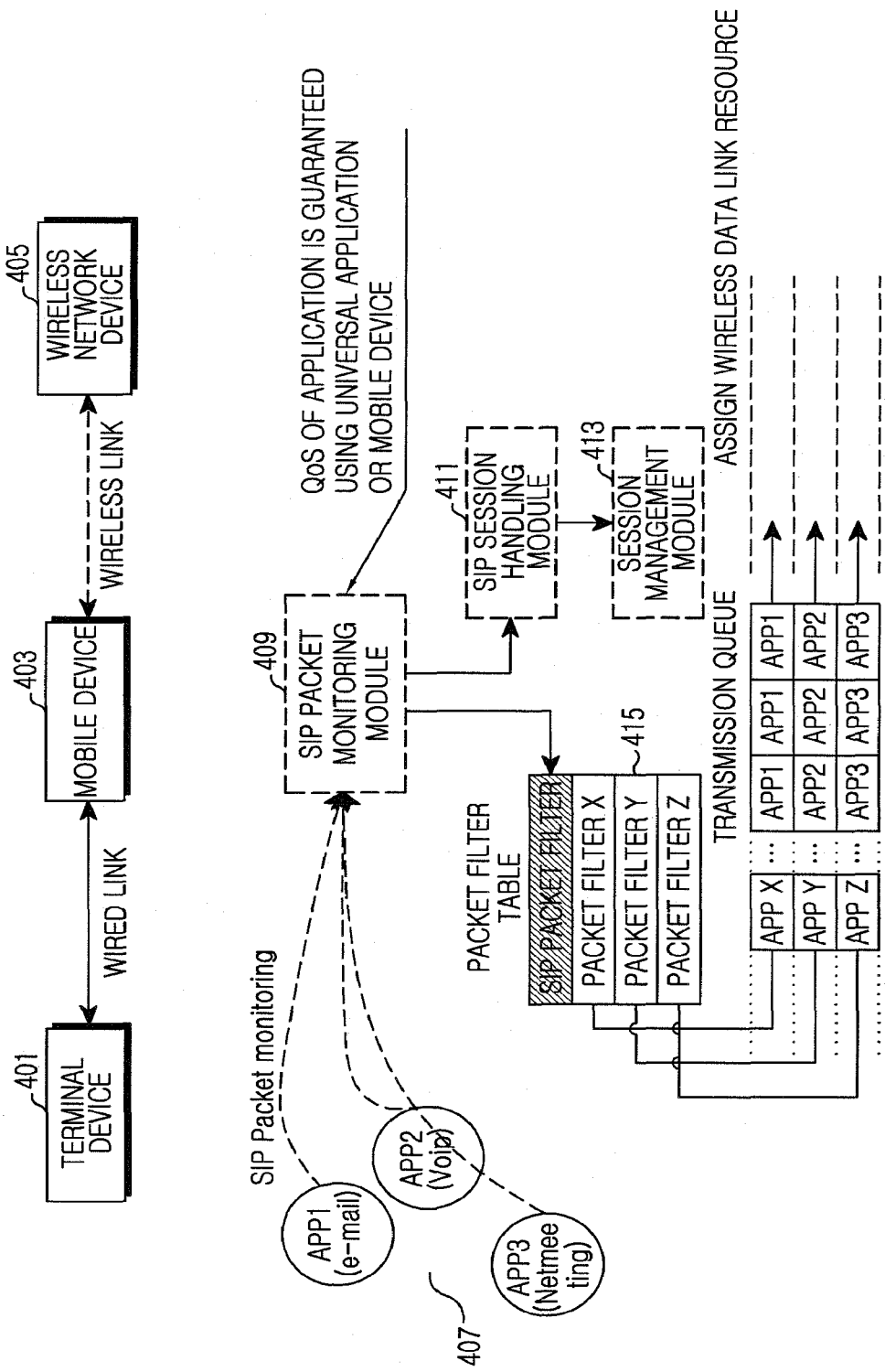
FIG. 4 is a view illustrating a structure for extracting QoS parameters in a wireless communication system according to an exemplary embodiment of the present invention.

FIG. 4 illustrates a structure for extracting QoS parameters in a wireless communication system according to an exemplary embodiment of the present invention.

First, when an Internet phone or a video communication 407, which is an application of a terminal device 401, is executed, and an SIP request packet is transmitted from the application to a wireless network device 405 via a mobile device 403, an SIP packet monitoring module 409 of the mobile device 403 monitors all packets coming from the terminal device. When an SIP request packet is received, that is, when a packet having an IP header whose protocol type is 'UDP' 17 and having a UDP header whose destination port number is '5060' is received, the SIP packet monitoring module 409 outputs the SIP request packet to an SIP handing module 411.

After that, the SIP session handling module 411 extracts SDP data from the SIP request packet, extracts QoS parameters from the SDP data, and outputs the extracted QoS parameters to a session management module 413.

Meanwhile, when receiving an SIP request packet from the terminal device 401, the wireless network device 405 transmits an SIP response packet. At this point, when the SIP packet monitoring module 409 of the mobile device receives an SIP request packet while monitoring packets coming from the wireless network device, that is, when a packet having an IP header whose protocol type is 'UDP (17)' and having a UDP header whose destination port number is '5060' is received, the SIP packet monitoring module 409 copies and forwards the received packet to the SIP session handling module 411, and transmits data to the terminal device.

A session management module 413 of the mobile device analyzes an SIP response packet, and maps the analyzed SIP response packet with a wireless link QoS parameter, and transmits a wireless link data resource request including a corresponding value to the wireless network device.

Meanwhile, when receiving the wireless link data resource request from the mobile device, the wireless network device transmits a wireless link data resource response, which is a response message to the request, to the mobile device.

After that, the session management module 413 of the mobile device processes the wireless link data resource response. Also, the session management module 413 extracts an uplink filter value which is extractable from the wireless link data resource response and which can discriminate a relevant application, and transmits the extracted uplink filter value to the SIP packet monitoring module 409 of the mobile device.

After that, the SIP packet monitoring module 409 adds the input uplink filter value to a packet monitoring list table 415.

Figure 5:
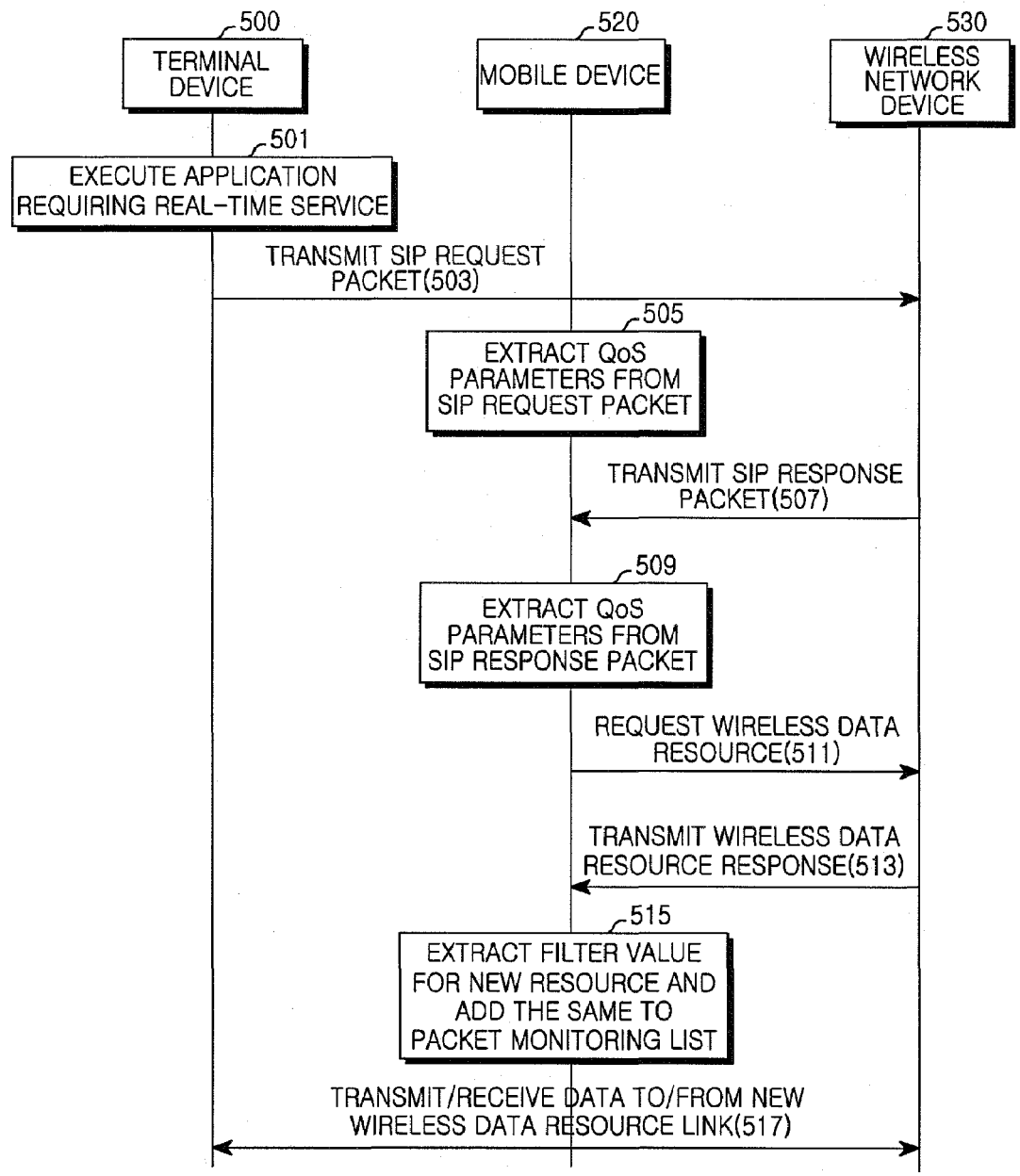
FIG. 5 is a view illustrating a signal flow for extracting QoS parameters in a wireless communication system according to an exemplary embodiment of the present invention.

FIG. 5 illustrates a signal flow for extracting QoS parameters in a wireless communication system according to an exemplary embodiment of the present invention.

Referring to FIG. 5, in step 501, when an application requiring a real-time service is executed, a terminal device 500 transmits an SIP request packet to a wireless network device 530 in step 503.

After that, when an SIP request packet is received while a mobile device 520 monitors packet signals of the terminal device 500, the mobile device 520 extracts QoS parameters from the SIP request packet.

After that, in step 507, the wireless network device 530 transmits an SIP response packet in response to the SIP request packet. At this point, in step 509, the mobile device 520 extracts QoS parameters for the SIP response packet, and in step 511, makes a request for a wireless data resource by performing a call setup request requesting the wireless network device to transmit a radio bearer (RB).

In step 513, the wireless network device 530 that has received the request for the wireless data resource transmits a wireless data resource response to the mobile device 520.

After that, the mobile device 520 extracts a filter value for a new resource, and adds the extracted filter value to a packet monitoring list.

After that, in step 517, the terminal device 500 and the wireless network device 530 transmits/receives data via a new wireless data resource link.

After that, an algorithm according to the present invention is ended.

In this description of examples of this invention, terminal devices and mobile devices are separately explained. However, it is fact obvious, these can be embedded in the same device.

For example, both the terminal device and mobile device can be embedded in one portable phone. As described above, according to the present invention, the mobile device receives the QoS information of the terminal device, and sets a wireless data resource link suitable for the QoS of an application being executed, so that the QoS of the application being executed is guaranteed, and a burden of a software or hardware can be reduced.

Although the invention has been shown and described with reference to certain preferred embodiments thereof, it will be understood by those skilled in the art that various changes in form and details may be made therein without departing from the spirit and scope of the invention as defined by the appended claims. Therefore, the scope of the present invention should not be limited to the above-described embodiments but should be determined by not only the appended claims but also the equivalents thereof.

The invention claimed is:

1. A method for extracting Quality of Service (QoS) parameters in a mobile device, the method comprising:
    monitoring all packets received from a terminal device to filter Session Initiation Protocol (SIP) packets;
    when a real-time service application is executed on the terminal device, and an SIP request packet or an SIP response packet is filtered and input, extracting QoS parameters from the SIP request packet or the SIP response packet;
    incorporating the extracted QoS parameters into a wireless link data resource request and transmitting the wireless link data resource request to a wireless network device;
    when a response to the wireless link data resource request is received, extracting an uplink filter value for a new resource from the response and adding the uplink filter value to a packet monitoring list; and
    discriminating data of the real-time service application from all data received from the terminal device using the uplink filter value and transmitting the discriminated data using the new resource.

2. The method of claim 1, wherein the SIP packets comprise packets having an Internet Protocol (IP) header whose protocol type is 'User Datagram Protocol (UDP)' and having a UDP header whose destination port number is '5060'.

3. The method of claim 1, wherein the real-time service application comprises an application requiring a real-time service, the application comprising an Internet phone, video communication, net meeting, and an electronic(e)-mail executed on the terminal device comprising a personal computer (PC).

4. An apparatus for extracting QoS parameters in a mobile device, the apparatus comprising:
    an Session Initiation Protocol (SIP) packet monitoring module for monitoring all packets received from a terminal device to filter SIP packets and adding an uplink filter value for a new resource input by a session management module to a packet monitoring list;
    an SIP session handling module for, when a real-time service application is executed on the terminal device and an SIP request packet or an SIP response packet is filtered and input, extracting QoS parameters from the SIP request packet or the SIP response packet; and
    a session management module for incorporating the extracted QoS parameters into a wireless link data resource request and transmitting the wireless link data resource request to a wireless network device, and when a response to the wireless link data resource request is received, extracting the uplink filter value for the new resource from the response and transferring the uplink filter value to the SIP packet monitoring module;
    wherein data of the real-time service application is discriminated from all data received from the terminal device using the extracted uplink filter value and the discriminated data is transmitted using the new resource.

5. The apparatus of claim 4, wherein the SIP packet monitoring module filters the SIP packets, that is, packets having an IP header whose protocol type is 'UDP(17)' and having a UDP header whose destination port number is '5060'.

6. The apparatus of claim 4, wherein the real-time service application comprises an application requiring a real-time service, the application comprising an Internet phone, video communication, net meeting, and an electronic(e)-mail executed on the terminal device comprising a personal computer (PC).

* * * * *